United States Patent
Forberg et al.

(10) Patent No.: US 11,172,124 B2
(45) Date of Patent: Nov. 9, 2021

(54) SYSTEM AND METHOD FOR VIDEO PROCESSING

(71) Applicant: Axis AB, Lund (SE)

(72) Inventors: Johan Forberg, Lund (SE); Hampus Linse, Lund (SE); Song Yuan, Lund (SE)

(73) Assignee: AXIS AB, Lund (SE)

( * ) Notice: Subject to any disclaimer, the term of this patent is extended or adjusted under 35 U.S.C. 154(b) by 14 days.

(21) Appl. No.: 16/862,913

(22) Filed: Apr. 30, 2020

(65) Prior Publication Data

US 2020/0382699 A1 Dec. 3, 2020

(30) Foreign Application Priority Data

May 29, 2019 (EP) ..................................... 19177238

(51) Int. Cl.
*H04N 5/232* (2006.01)
*H04N 19/159* (2014.01)
*H04N 19/172* (2014.01)
*H04N 19/59* (2014.01)

(52) U.S. Cl.
CPC ..... *H04N 5/23229* (2013.01); *H04N 5/23267* (2013.01); *H04N 19/159* (2014.11); *H04N 19/172* (2014.11); *H04N 19/59* (2014.11)

(58) Field of Classification Search
None
See application file for complete search history.

(56) References Cited

U.S. PATENT DOCUMENTS

| 8,594,203 B2 | 11/2013 | Ugur et al. |
| 2002/0118761 A1 | 8/2002 | Lee |
| 2007/0140580 A1 | 6/2007 | Heath et al. |
| 2009/0096878 A1 | 4/2009 | Chen et al. |
| 2011/0069229 A1 | 3/2011 | Lord |

(Continued)

FOREIGN PATENT DOCUMENTS

| EP | 1624675 A1 | 2/2006 |
| JP | 2006-109060 A | 4/2006 |

OTHER PUBLICATIONS

Extended European Search Report dated Oct. 29, 2019 for the European Patent Application No. 19177238.3.

*Primary Examiner* — Stuart D Bennett
(74) *Attorney, Agent, or Firm* — Volpe Koenig

(57) ABSTRACT

A video processing comprises a video image processing pipeline and an encoder. The video image processing pipeline is processes images of captured video data and comprises: an image stream forming function which generates a first and second image streams each comprising a plurality of image frames, and an image stabilization function for image stabilizing the first image stream, thereby forming a stabilized image stream. The image stream forming function bypasses the second image stream from the image stabilization function, thereby forming an original image stream. The encoder encodes the stabilized image stream and the original image stream as a joint encoded image stream comprising encoded frames based on images frames from both the stabilized \the original image streams, wherein the joint encoded image stream comprises intra and inter frames, and wherein the intra frames are exclusively encoded based on image frames of the original image stream.

9 Claims, 3 Drawing Sheets

(56) References Cited

U.S. PATENT DOCUMENTS

2011/0102593 A1   5/2011   Pardue
2011/0228112 A1   9/2011   Kaheel et al.
2017/0134746 A1   5/2017   Lawrence et al.
2017/0339345 A1   11/2017  Chua et al.
2019/0116382 A1* 4/2019   Edpalm ................ H04N 19/517

* cited by examiner

SYSTEM AND METHOD FOR VIDEO PROCESSING

TECHNICAL FIELD

The present invention relates to video processing. Especially, video processing aiming at reducing the amount of data needed to be communicated and/or stored upon processing video data captured by a video camera that is shaking.

BACKGROUND

For some video capturing applications, stabilization of images in a captured video stream is needed in order to get a more viewable video stream. This is especially true for video capturing situations wherein the video camera used for capturing the video stream is mounted on a moving object, such as a vehicle, or worn by a person. A specific example is a body camera worn by a police officer. The stabilization of images in a captured video stream may e.g. be made using electronic image stabilization, EIS.

For some applications, e.g. for evidence purposes using a video stream captured by a body camera worn by a police officer, both the stabilized video stream and the non-stabilized "original" video stream may be needed. However, producing two video streams will significantly increase both bandwidth needed to communicate the video information and the storage space needed to store the video information. Hence, there is a need for improvements in reducing the amount of data needed to be communicated and/or stored for both the "original" and stabilized video information.

SUMMARY

Mitigating, alleviating or eliminating one or more of the above-identified deficiencies in the art and disadvantages singly or in any combination and at least partly solve the above mentioned problem would be beneficial.

According to a first aspect a video processing method is provided. The video processing method comprises: generating, based on a series of images of captured video data, a first image stream and a second image stream, wherein the first image stream comprises a plurality of image frames and the second image stream comprises a plurality of image frames; applying an image stabilization function on the first image stream, thereby forming a stabilized image stream; bypassing the second image stream from the image stabilization function, thereby forming an original image stream; and encoding the stabilized image stream and the original image stream as a joint encoded image stream comprising encoded frames based on image frames from both the stabilized image stream and the original image stream, wherein the joint encoded image stream comprises intra frames and inter frames, and wherein intra frames of the joint encoded image stream are exclusively encoded based on image frames of the original image stream.

The image stabilization function may be an electronic image stabilization function. Such image stabilization functions are well known in the art. This present teachings provide a way to efficiently encode the video information from both the stabilized image stream and the original video stream. By doing so both the stabilized video stream and the original, unmodified or non-stabilized, video stream can be made available. This may be valuable in certain forensic situations, such as body worn police cameras where both a stabilized video stream and the original video stream might be needed. This allows both the stabilized video stream and the original video stream to be available while fitting a tight bitrate budget, since both video streams are combined into one joint video stream and rely on the "same" intra frames. Hence, instead of encoding the two separate video streams, a joint video stream comprising the two is formed.

As will be described in detail hereinafter, two series of inter-frames (P-frames), one comprising information from the original video stream (series O) and one comprising information from the stabilized video stream (series S), will be encoded between each pair of Intra frames (I-frames). Series O is encoded using an I-frame from the original image stream as Intra frame. This corresponds to normal encoding without stabilization resulting in an encoded original video stream. Series S is encoded using the same I-frame from the original image stream as Intra frame. This will result in a series of video frames of an encoded stabilized video stream. By the use of the I-frame from the original image stream as Intra frame the encoded series S will have the correct residuals for the calculated motion vectors. This may result in little or no quality loss. Also bitrate will be saved compared to coding two completely separate streams; since series O and S may share I-frames, only needing different P-frames. Either series O or S may be designated as the default stream, with the other series of being marked as no-display. A user may switch between the streams at will. In any case, both streams are available for viewing at a later point if necessary.

The remaining image frames of the original image stream may be encoded into inter frames.

The image frames of the original image stream may be indicated as no-display frames in the joint encoded image stream.

The step of generating the first image stream and the second image stream may comprise duplicating the series of images of the captured video data into the first and second image streams.

The step of generating the first image stream and the second image stream may comprise: generating the first image stream from each image of the series of images of the video data; and generating the second image stream from a subset of the images of the series of images of the captured video data.

The step of generating the first image stream and the second image stream may comprise: generating the first image stream from a subset of the images of the series of images of the captured video data; and generating the second image stream from each image of the series of images of the video data.

The step of generating the first image stream and the second image stream may comprise: generating the first image stream from a first subset of the images of the series of images of the captured video data; and generating the second image stream from a second subset of images of the series of images of the video data.

Images of the first subset may be exclusively comprised in the first image stream. Images of the second subset may be exclusively comprised in the second image stream.

The inter encoded frames of the original image stream in the joint encoded image stream may exclusively reference to other encoded frames of the original image stream in the joint encoded image stream.

The inter encoded frames of the stabilized image stream in the joint encoded image stream may exclusively reference to other inter encoded frames of the stabilized image stream in the joint encoded image stream or the intra frame.

The step of applying an image stabilization function on the first image stream may comprise maintaining a spatial resolution of the image frames of the stabilized image stream as compared with a spatial resolution of the image frames of the first image stream.

The image frames of the stabilized image stream may be indicated as no-display frames in the joint encoded image stream.

According to a second aspect a non-transitory computer-readable storage medium is provided. The non-transitory computer-readable storage medium having stored thereon instructions for implementing the method according to the first aspect, when executed on a device having processing capabilities.

According to a third aspect a video processing system is provided. The video processing system comprises: a video image processing pipeline and an encoder. The video image processing pipeline is configured to process a series of images of captured video data. The video image processing pipeline comprises: an image stream forming function configured to, based on the captured video data, generate a first and a second image stream, each comprising a plurality of image frames; and an image stabilization function configured to image stabilize the first image stream, thereby forming a stabilized image stream. The image stream forming function is further configured to bypass the second image stream from the image stabilization function, thereby forming an original image stream. The encoder is configured to encode the stabilized image stream and the original image stream as a joint encoded image stream comprising encoded frames based on images frames from both the stabilized image stream and the original image stream, wherein the joint encoded image stream comprises intra frames and inter frames, and wherein the intra frames of the joint encoded image stream is exclusively encoded based on image frames of the original image stream.

The video processing system may be implemented in a video camera, especially a digital video camera. The video camera may be a monitoring camera.

The above mentioned features of the first aspect, when applicable, apply to this third aspect as well. In order to avoid undue repetition, reference is made to the above.

A further scope of applicability will become apparent from the detailed description given below. However, it should be understood that the detailed description and specific examples, while indicating preferred embodiments, are given by way of illustration only, since various changes and modifications will become apparent to those skilled in the art from this detailed description.

Hence, it is to be understood that is the teachings are not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects will now be described in more detail, with reference to appended figures. The figures should not be considered limiting; instead they are used for explaining and understanding.

As illustrated in the figures, the sizes of layers and regions may be exaggerated for illustrative purposes and, thus, are provided to illustrate the general structures. Like reference numerals refer to like elements throughout.

DETAILED DESCRIPTION

The described description will be set forth more fully hereinafter with reference to the accompanying drawings, in which currently preferred embodiments are shown. However, the teachings may be embodied in many different forms and should not be construed as being limited to the embodiments set forth herein; rather, these embodiments are provided for thoroughness and completeness, and to fully convey the scope to the skilled person.

Figure 1:
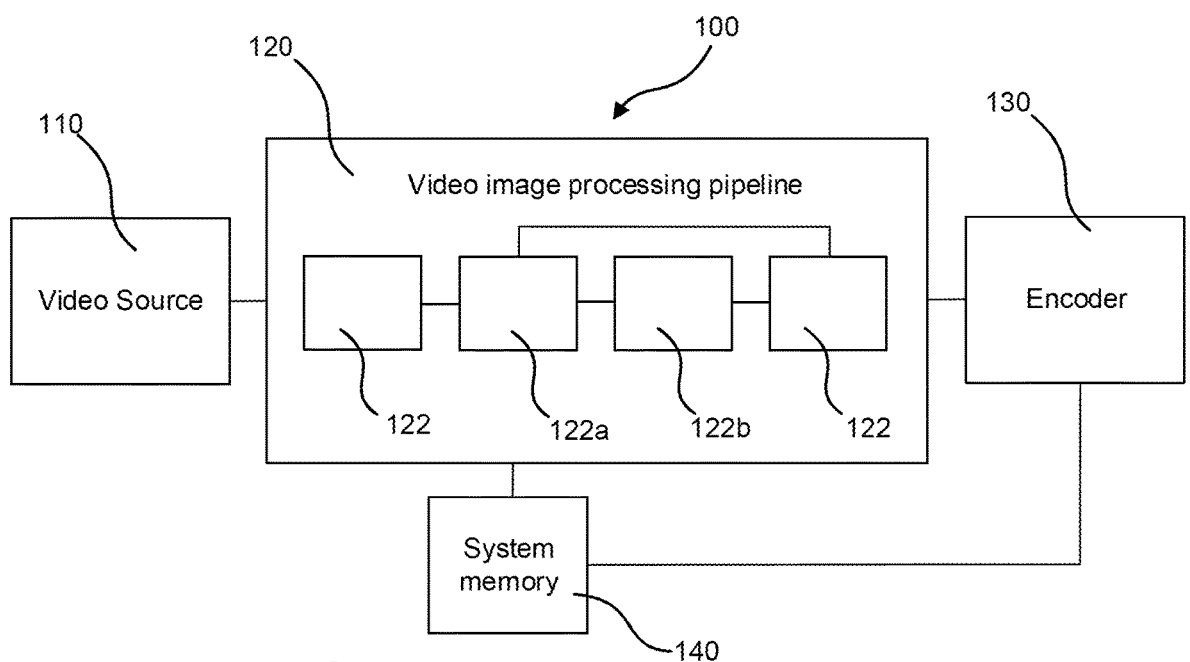
FIG. 1 schematically illustrates a video image processing system.
Figure 2:
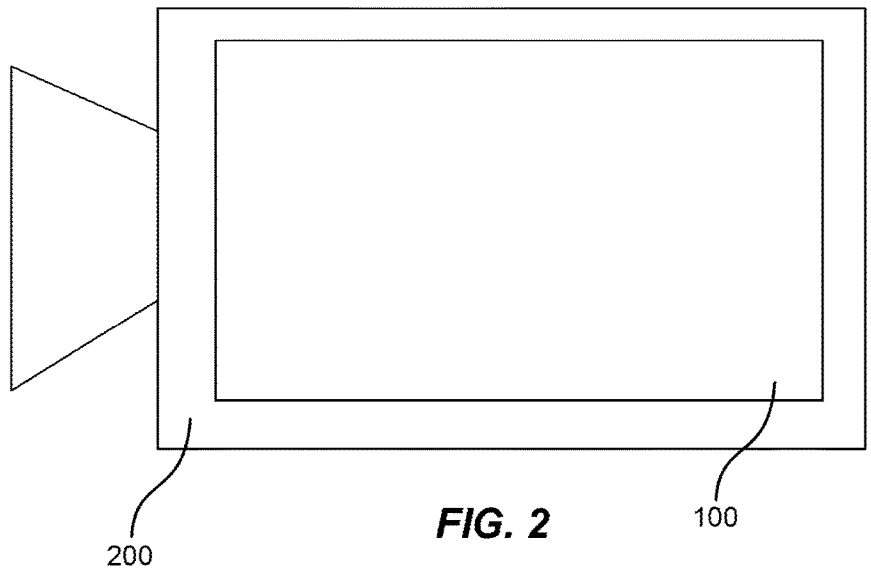
FIG. 2 schematically illustrates a camera comprising the video image processing system of FIG. 1.

In connection with FIG. 1 a video image processing system 100 configured to generate and process video image data will be discussed. The video image processing system 100 comprises a video source 110, a video image processing pipeline 120 and an encoder 130. As illustrated in FIG. 2, the video image processing system 100 may be implemented in a video camera 200. The video camera 200 may be digital video camera. The video camera 200 may be a monitoring camera. The video camera 200 may be a video camera being mounted on a moving object, such as a vehicle. The video camera 200 may be worn by a person.

The video source 110 is configured to capture video data. The video data may be a series of images. The video source 110 may be an image sensor. The image sensor is configured to capture the video image data. The video source 110 is configured to transfer the captured video image data to the video image processing pipeline 120.

The video image processing pipeline 120 is configured to process the video image data into image frames of a video stream. The video image processing pipeline 120 comprises a plurality of processing functions 122. Each processing function 122 is configured to process the video image data. Some of the plurality of processing functions 122 may be dependent on each other. Hence, they need to be executed one after another. Some of the plurality of processing functions 122 may be independent on each other. Hence, they may be executed in parallel.

A specific processing function 122 of the video image processing pipeline 120 may be implemented as a computer software portion run on a general purpose processor or on a graphics processing unit, a field-programmable gate array, a fixed-function application-specific integrated circuit, or an analog circuit. Every one of the plurality of processing function 122 may be implemented using the same type of implementation. Different ones of the plurality of processing function 122 may be implemented using different implementations of the processing function 122. A subset of the plurality of processing function 122 may be implemented using the same type of implementation. Accordingly, a specific processing function 122 of the video image processing pipeline 120 may be implemented as software, dedicated hardware or firmware, or some combination of dedicated hardware, firmware and/or software.

The video image processing system 100 may further comprise a system memory 140. The system memory 140 may be used by a processing function 122 of the video image processing pipeline 120 while processing the video image data. The system memory 140 may comprise a volatile memory, such as a random-access memory, RAM. The system memory 140 may also be used by the encoder 130 during encoding.

The video image processing pipeline 120 comprises an image stream forming function 122a and an image stabilization function 122b. The image stabilization function 122b is to be performed downstream of the image stream forming function 122a. The image stream forming function 122a and the image stabilization function 122b will be discussed in more detail further down in this specification.

In addition to the image stream forming function 122a and the image stabilization function 122b, the video image processing pipeline 120 may comprise one or more additional processing functions 122. The one or more additional processing functions 122 may be one or more of the following: an image sensor correction function, a noise reduction function, an image scaling function, a gamma correction function, an image enhancement function, a color space conversion function, an exposure merge function (e.g. WDR/HDR) and a chroma subsampling function.

The image stream forming function 122a is configured to, based on the captured video data, create a first and a second image stream. Each of the first and second image streams comprising a plurality of image frames. The image stream forming function 122a may generate the first and the second image stream by duplicating the series of images of the video data into the first and second image streams. Hence, each image of the series of images may be used as an image in both the first and the second image stream. Alternatively, the image stream forming function 122a may generate the image frames of the first image stream based on each image of the series of images of the video data and generate the image frames of the second image stream based on a subset of the images of the series of images of the video data. Hence, each image of the series of images may be used as an image in the first image stream and a subset of the images of the series of images may be used as the images in the second image stream. Yet alternatively, the image stream forming function 122a may generate image frames of the second image stream based on each image of the series of images of the video data and generate the image frames of the first image stream based on a subset of the images of the series of images of the video data. Hence, each image of the series of images may be used as an image in the second image stream and a subset of the images of the series of images may be used as the images in the first image stream. Further alternatively, the image stream forming function 122a may generate image frames of the first image stream based on a first subset of the images of the series of images of the video data and generate the image frames of the second image stream based on a second subset of the images of the series of images of the video data. The first and second subset may or may not overlap. In case the first and second subset does not overlap, the first subset will be exclusively comprised in the first image stream and second subset will be exclusively comprised in the second image stream. Hence, a specific image of the series of images may be used as either an image in the first image stream or an image in the second image stream.

The image stream forming function 122a is configured to provide the first image stream to the image stabilization function 122b. Hence, the first image stream is sent to the image stabilization function 122b for further processing by the image stabilization function 122b. The image stream forming function 122a is configured to bypass the second image stream from the image stabilization function 122b. Hence, the second image stream is bypassed from processing at the image stabilization function 122b. The bypassed image stream will be referred to as an original image stream. The original image stream is a non-stabilized image stream.

The image stabilization function 122b is configured to apply an image stabilization function on the first image stream. Preferably, the image stabilization function is an electronic image stabilization, EIS, function. The resulting image stream after being processed by the image stabilization function 122b is referred to as a stabilized image stream. Hence, the image stabilization function 122b is configured to form the stabilized image stream from the first image stream.

The image stabilization function 122b may be set to maintain a spatial resolution of the image frames of the stabilized image stream as compared with a spatial resolution of the image frames of the first image stream. Hence, the spatial resolution of the images frames of both the stabilized image stream and the original image stream are the same.

The encoder 130 is configured to encode images frames of a video stream in to an encoded video stream. The encoder 130 may be set to use any suitable encoding scheme. Non-limiting examples are H.264, H.265 and AV1.

The encoder 130 is configured to encode the stabilized image stream and the original image stream as a joint encoded image stream. The joint encoded image stream comprises encoded frames based on images frames from both the stabilized image stream and the original image stream. The encoder is configured to encode the joint encoded image stream to comprise both intra encoded frames and inter encoded frames. The encoder 130 is configured to exclusively encode the intra frames of the joint encoded image stream based on image frames of the original image stream. The encoder 130 may be configured to encode the remaining image frames of the original image stream into inter frames. The encoder 130 may be configured to encode the image frames of the stabilized image stream into inter frames.

Figure 3A:
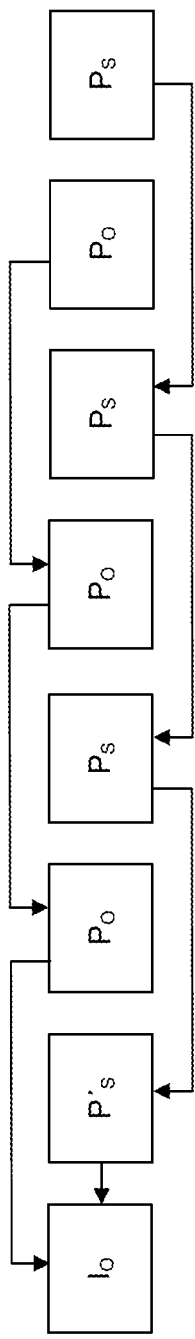
FIGS. 3A, 3B and 3C schematically illustrates different GOP structures of a joint encoded video stream.
Figure 3B:
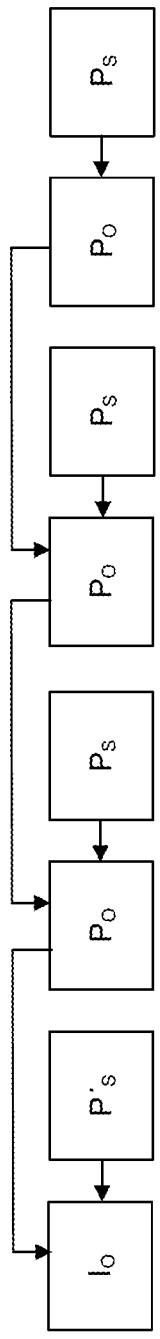
Figure 3C:
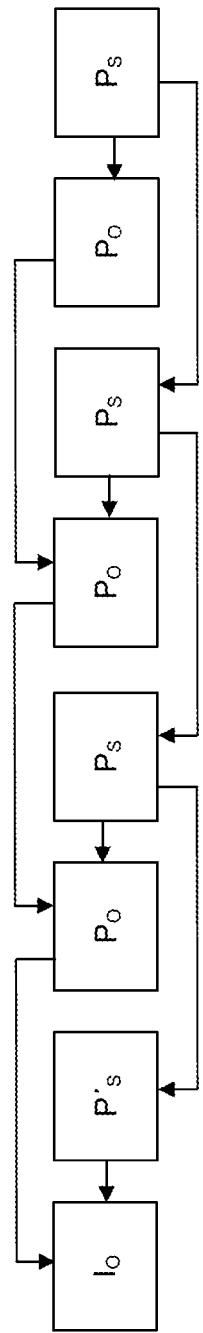

In connection with FIGS. 3a, 3b and 3c three examples of a Group of Picture, GoP, structures of a joint encoded image stream are illustrated. The intra frame, I-frame, is encoded based on an image frame of the original image stream, this is indicated as an $I_O$-frame, where the subscript O indicates that the I-frame is based on an image frame from the original image stream. The inter-frames, P-frames, are encoded based on either an image frame from the stabilized image stream, these P-frames are indicated as $P_S$-frames, where S indicates that the P-frame is based on an image frame from the stabilized image stream, or an image frame from the original image stream, these P-frames are indicated as $P_O$-frames, where O indicates that the P-frame is based on an image frame from the original image stream. The first in order of P-frames may be an encoded version of image stabilized version of the original frame used for encoding the Intra frame, i.e. the $I_O$-frame. This first in order P-frame is FIGS. 3A, 3B and 3C denoted as a $P'_S$-frame illustrating its special character.

As illustrated in FIG. 3A, the encoder 130 may be configured such that a $P_O$-frame exclusively reference to another $P_O$-frame or the $I_O$-frame and such that a $P_S$-frame exclusively reference to another $P_S$-frame or the $I_O$-frame.

As illustrated in FIG. 3B the encoder 130 may be configured such that a $P_O$-frame exclusively reference to another $P_O$-frame or the $I_O$-frame and such that a $P_S$-frames exclusively reference to a $P_O$-frame or the $I_O$-frame.

As illustrated in FIG. 3C the encoder 130 may be configured such that a $P_O$-frame exclusively reference to another $P_O$-frame or to the $I_O$-frame and such that a $P_S$-frame reference to both a $P_O$-frame or the $I_O$-frame and to a $P_S$-frame.

Above it has been discussed that the Inter-frames are encoded as P-frames. It is however also possible to encode one or more of the P-frames as a B-frame.

The encoder 130 may be configured to indicate the image frames of the original image stream no-display frames in the joint encoded image stream. Doing so a decoder set to decode the joint encoded image stream will be instructed to only display the images frames of the stabilized image stream. Hence, to only display the decoded versions of the $P_S$ frames (including the $P'_S$ frame.

Figure 4:
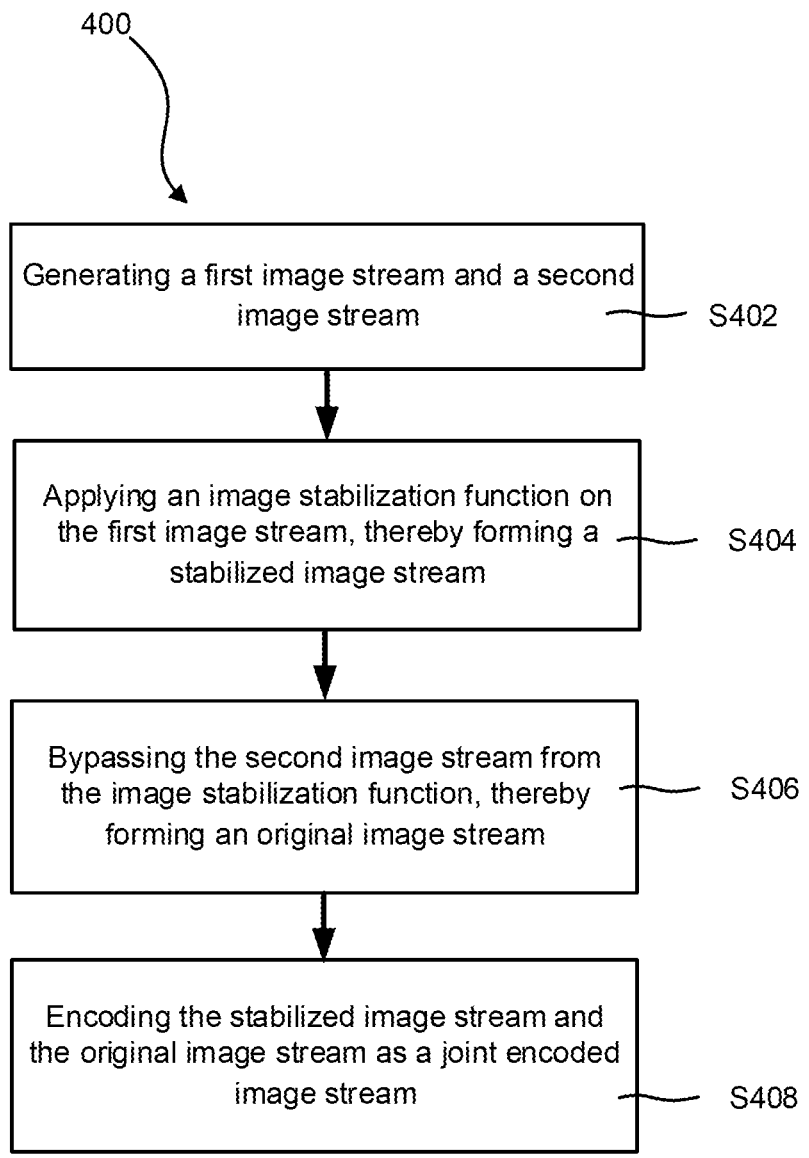
FIG. 4 is a block scheme of an image processing method.

In connection with FIG. 4. a video processing method 400 will be discussed. The video processing method is configured to encode captured video data. The video processing method comprises the following steps/acts.

Generating S402 a first image stream and a second image stream. The generation of the first image stream and the second image stream is based on a series of images of the captured video data. The first image stream is generated to comprise a plurality of image frames. The second image stream is generated to comprise a plurality of image frames. Generating S402 the first image stream and the second image stream may comprise duplicating the series of images of the captured video data into the first and second image streams. Generating S402 the first image stream and the second image stream may comprise: generating the first image stream from each image of the series of images of the video data; and generating the second image stream from a subset of the images of the series of images of the captured video data. Generating S402 the first image stream and the second image stream may comprise: generating the first image stream from a subset of the images of the series of images of the captured video data; and generating the second image stream from each image of the series of images of the video data. Generating S402 the first image stream and the second image stream may comprise: generating the first image stream from a first subset of the images of the series of images of the captured video data; and generating the second image stream from a second subset of images of the series of images of the video data. Images of the first subset may exclusively be comprised in the first image stream. Images of the second subset may exclusively be comprised in the second image stream.

Applying S404 an image stabilization function on the first image stream, thereby forming a stabilized image stream. Applying S404 the image stabilization function on the first image stream may comprise maintaining a spatial resolution of the image frames of the stabilized image stream as compared with a spatial resolution of the image frames of the first image stream.

Bypassing S406 the second image stream from the image stabilization function, thereby forming an original image stream.

Encoding S408 the stabilized image stream and the original image stream as a joint encoded image stream. The joint encoded image stream comprising encoded frames based on image frames from both the stabilized image stream and the original image stream. The joint encoded image stream comprises intra frames and inter frames. The intra frames of the joint encoded image stream are exclusively encoded based on image frames of the original image stream. The remaining image frames of the original image stream may be encoded into inter frames. The image frames of the stabilized image stream may be encoded into inter frames. During the encoding S408 the image frames of the original image stream may be indicated as no-display frames. Encoding S408 may comprise, when encoding the inter encoded frames of the original image stream, in the joint encoded image stream, exclusively reference to other encoded frames of the original image stream, in the joint encoded image stream. Encoding S408 may comprise, when encoding the inter encoded frames of the stabilized image stream, in the joint encoded image stream, exclusively reference to other inter encoded frames of the stabilized image stream, in the joint encoded image stream, or the intra frame.

The person skilled in the art realizes that the description herein by no means is limited to the preferred embodiments. On the contrary, many modifications and variations are possible within the scope of the appended claims.

For example, the encoder 130 may be configured to indicate the image frames of the stabilized image stream no-display frames in the joint encoded image stream. Hence, during the encoding the image frames of the stabilized image stream may be indicated as no-display frames. Doing so a decoder set to decode the joint encoded image stream will be instructed to only display the images frames of the original image stream.

Additionally, variations to the disclosed embodiments can be understood and effected by the skilled person in practicing the claims, from a study of the drawings, the disclosure, and the appended claims.

The invention claimed is:

1. A video processing method, the video processing method comprising:
    generating, based on a series of images of captured video data, a first image stream and a second image stream by duplicating the series of images of captured video data into the first and second image streams, wherein the first image stream comprises a plurality of image frames and the second image stream comprises a plurality of image frames;
    applying an image stabilization function on the first image stream, thereby forming a stabilized image stream;
    bypassing the second image stream from the image stabilization function, thereby forming an original image stream; and
    encoding, in an encoder using the stabilized image stream and the original image stream as input data to the encoder, video information from image frames of both the stabilized image stream and the original image stream as a joint encoded image stream such that
    a group of pictures of the joint encoded image stream comprises an intra frame, a first series of inter frames, and a second series of inter frames,
    wherein the intra frame and the first series of inter frames encode video information from image frames of the original video stream, and the second series of inter frames encodes video information from image frames of the stabilized image stream
    wherein the first inter frame in the second series of inter frames exclusively references the intra frame and subsequent inter frames in the second series of inter frames exclusively reference other inter frames in the second series of inter frames, and
    wherein the first inter frame of the first series of inter frames exclusively references the intra frame and subsequent inter frames in the first series of inter frames exclusively reference other inter frames in the first series of inter frames.

2. The video processing method according to claim 1, wherein the image frames of the original image stream are indicated as no-display frames in the joint encoded image stream.

3. The video processing method according to claim 2, wherein the image frames of the stabilized image stream are indicated as no-display frames in the joint encoded image stream.

4. A non-transitory computer-readable storage medium having stored thereon instructions for implementing the video processing method according to claim 2, when executed on a device having processing capabilities.

5. The video processing method according to claim 1, wherein the image frames of the stabilized image stream are indicated as no-display frames in the joint encoded image stream.

6. A non-transitory computer-readable storage medium having stored thereon instructions for implementing the video processing method according to claim 5, when executed on a device having processing capabilities.

7. A non-transitory computer-readable storage medium having stored thereon instructions for implementing the video processing method according to claim 1, when executed on a device having processing capabilities.

8. A video processing system comprising:
a video image processing pipeline configured to process a series of images of captured video data into an original image stream and a stabilized image stream, the video image processing pipeline comprising:
an image stream forming function configured to, based on the captured video data, generate a first and a second image stream each comprising a plurality of image frames, and
an image stabilization function configured to image stabilize the first image stream, thereby forming the stabilized image stream,
wherein the image stream forming function is further configured to bypass the second image stream from the image stabilization function, thereby forming the original image stream; and
an encoder configured to, using the stabilized image stream and the original image stream as input data, encode video information from image frames of both the stabilized image stream and the original image stream as a joint encoded image stream such that a group of pictures of the joint encoded image stream comprises an intra frame, a first series of inter frames, and a second series of inter frames,
wherein the intra frame and the first series of inter frames encode video information from image frames of the original video stream, and the second series of inter frames encodes video information from image frames of the stabilized image stream, and
wherein the first inter frame in the second series of inter frames exclusively references the intra frame and subsequent inter frames in the second series of inter frames exclusively reference other inter frames in the second series of inter frames
wherein the first inter frame of the first series of inter frames exclusively references the intra frame and subsequent inter frames in the first series of inter frames exclusively reference other inter frames in the first series of inter frames.

9. The video processing system according to claim 8, implemented in a video camera.

\* \* \* \* \*